(12) United States Patent
Lee et al.

(10) Patent No.: US 9,094,987 B2
(45) Date of Patent: Jul. 28, 2015

(54) METHOD FOR GENERATING RANDOM ACCESS SIGNAL OF MACHINE TYPE COMMUNICATION DEVICE USING NARROW BANDWIDTH

(71) Applicant: Electronics and Telecommunications Research Institute, Daejeon (KR)

(72) Inventors: Moon Sik Lee, Daejeon (KR); Young Seog Song, Daejeon (KR); Jun Hwan Lee, Seoul (KR); Seung Nam Choi, Daejeon (KR); Il Gyu Kim, Chungbuk (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 206 days.

(21) Appl. No.: 13/627,386

(22) Filed: Sep. 26, 2012

(65) Prior Publication Data

US 2013/0077584 A1  Mar. 28, 2013

(30) Foreign Application Priority Data

Sep. 26, 2011 (KR) .................. 10-2011-0097196
Oct. 26, 2011 (KR) .................. 10-2011-0109842
Jun. 8, 2012 (KR) .................. 10-2012-0061215

(51) Int. Cl.
*H04W 74/08* (2009.01)
*H04W 4/00* (2009.01)
*H04W 72/04* (2009.01)

(52) U.S. Cl.
CPC .......... *H04W 74/0833* (2013.01); *H04W 4/005* (2013.01); *H04W 72/0453* (2013.01)

(58) Field of Classification Search
None
See application file for complete search history.

(56) References Cited

U.S. PATENT DOCUMENTS

| 2011/0299492 | A1* | 12/2011 | Lee et al. | 370/329 |
| 2012/0099543 | A1* | 4/2012 | Yang et al. | 370/329 |
| 2012/0275378 | A1* | 11/2012 | Lee | 370/328 |
| 2013/0128733 | A1* | 5/2013 | Lee et al. | 370/230 |
| 2013/0242912 | A1* | 9/2013 | Wu | 370/329 |
| 2013/0301524 | A1* | 11/2013 | Xu et al. | 370/328 |

* cited by examiner

*Primary Examiner* — Ian N Moore
*Assistant Examiner* — Latresa McCallum
(74) *Attorney, Agent, or Firm* — Nelson Mullins Riley & Scarborough LLP (57) ABSTRACT

Disclosed are a method for generating a random access signal of a machine type communication (MTC) device using a narrow bandwidth, and an MTC device. The method generates a random access signal by allocating a position in a frequency domain of a random access signal dedicated to the MTC device, that is, a position of a frequency for transmission of a random access preamble, to a center position of a base station system bandwidth, or by shifting a center frequency of the MTC device to a position of a random access frequency allocated for a legacy LTE terminal by a base station.

13 Claims, 4 Drawing Sheets

METHOD FOR GENERATING RANDOM ACCESS SIGNAL OF MACHINE TYPE COMMUNICATION DEVICE USING NARROW BANDWIDTH

CLAIM FOR PRIORITY

This application claims priority to Korean Patent Application No. 10-2011-0097196 filed on Sep. 26, 2011,, Korean Patent Application No. 10-2011-0109842, filed on Oct. 26, 2011,, and Korean Patent Application No. 10-2012-0061215, filed on Jun. 8, 2012, in the Korean Intellectual Property Office (KIPO), the entire contents of which are hereby incorporated by reference.

BACKGROUND

1. Technical Field

Example embodiments of the present invention relate in general to a method for generating a random access signal, and more specifically, to a method for generating a random access signal of a machine type communication device using a narrow bandwidth.

2. Related Art

Machine type communication (MTC) or machine-to-machine communication means data communication related to one or more entities that does not require human intervention.

A service optimized for MTC is different from a service optimized for human-to-human communication. MTC is different from the existing mobile network communication relating to characteristics such as a) various market scenarios, b) data communications, c) lower cost and effort, d) many potential communicating terminals, e) large range, and f) small traffic for each terminal.

Examples of the type of MTC service include smart metering, tracking & tracing, remote maintenance & control, and e-health.

Recently, 3GPP (3rd Generation Partnership Project) is standardizing machine type communication (MTC) for human-to-machine communication and machine-to-machine intelligent communication. Many MTC devices are arranged and operated for various MTC applications that have smart metering and remote control as main functions.

In a 3GPP (3rd Generation Partnership Project) LTE (Long Term Evolution) system, since an MTC device or a general user is treated as one user equipment (UE), it should be separately registered in an LTE network. The arrangement of many MTC devices causes scheduling contention for channel allocation, depletion of wireless resources, overload by signal generation, and adversely affects the existing general terminals. 3GPP is performing standardization, concentrating on minimizing the adverse effects caused by the arrangement of MTC devices. In addition, effort is being made to provide low-cost MTC devices to extend MTC service through LTE.

In this regard, all LTE-based UEs are standardized to support a transmission/reception bandwidth of up to 20, MHz. Accordingly, a general LTE UE, which is a legacy terminal from the viewpoint of an MTC device, can access a base station (eNodeB) having a 1.4, MHz, 3, MHz, 5, MHz, 10, MHz, 15, MHz or 20, MHz bandwidth. In general, an MTC device or terminal transmits a very small amount of information. Therefore, supporting a bandwidth up to 20, MHz for an MTC device as with a general UE may be a considerable waste of cost from the viewpoint of an MTC device aiming at low cost.

In order to solve this problem, discussions are being held to have MTC devices operate with a narrow bandwidth. That is, while a base station uses a wide bandwidth, an MTC device uses a narrow bandwidth of up to 1.4, MHz or 5, MHz. To this end, there is a need to provide a separate wireless transmission standard for supporting communication between a base station and an MTC device having a narrow bandwidth.

SUMMARY

Accordingly, example embodiments of the present invention are provided to substantially obviate one or more problems due to limitations and disadvantages of the related art.

Example embodiments of the present invention provide a method for generating a random access signal by a machine type communication device using a narrow bandwidth in a 3GPP LTE mobile communication system supporting a scalable system bandwidth of up to 20, MHz.

Example embodiments of the present invention also provide a machine type communication device using the method for generating a random access signal.

In some example embodiments, a method for generating a random access signal of a machine type communication (MTC) device using a narrow bandwidth generates a random access signal by allocating a position in a frequency domain of a random access signal dedicated to the MTC device, that is, a position of a frequency for transmission of a random access preamble, to a center position of a base station system bandwidth.

In other example embodiments, a method for generating a random access signal of an MTC device using a narrow bandwidth generates a random access signal by shifting a center frequency of the MTC device to a position of a random access frequency allocated for a legacy LTE terminal by a base station.

In still other example embodiments, a method for generating a random access signal of an MTC device using a narrow bandwidth includes: receiving information on a random access preamble format and transmission time from an upper layer; and generating a ransom access signal by using the information on the random access preamble format and the transmission time and predetermined frequency resource block-related information for a random access signal according to the bandwidth of the MTC device.

Herein, a dedicated bandwidth of the MTC device may be set to, for example, 1.4 MHz.

In still other example embodiments, a method for generating a random access signal of an MTC device using a narrow bandwidth includes: receiving system information transmitted by a base station (BS); extracting random access-related information from the system information received; and generating a random access signal by using the random access-related information extracted and predetermined frequency resource block-related information for a random access signal.

The random access-related information may include information on a preamble format and transmission time.

The predetermined frequency resource block-related information for the random access signal may include information on a first physical resource block occupied by a physical random access channel resource.

A position of the first physical resource block occupied by the physical random access channel resource may be set to a fixed value according to the bandwidth of the MTC device.

A band used by the MTC device may be located within a system bandwidth used by the base station.

The band used by the MTC device may be located at a center of the system bandwidth used by the base station.

The method may further include: acquiring information on a band allocated for a random access signal of a general user equipment (UE) by the base station; and when the band allocated for the random access signal of the general UE deviates from the band of the MTC device, shifting a center of the band of the MTC device toward the band allocated for the random access signal of the general UE such that the band allocated for the random access signal of the general UE is included within the band of the MTC device.

In still other example embodiments, an MTC device receives information on a random access preamble format and transmission time from an upper layer, and generates a random access signal by using the information on the random access preamble format and the transmission time and frequency resource block-related information for a random access signal according to the bandwidth of the MTC device.

In still other example embodiments, an MTC device includes: a transmitting/receiving unit configured to receive system information transmitted by a base station (BS); and a control unit configured to extract random access-related information from the system information received, and generate a random access signal by using the random access-related information received and predetermined frequency resource block-related information for a random access signal.

The control unit may acquire information on a band allocated for a random access signal of a general user equipment (UE) by the base station from the system information received by the transmitting/receiving unit, and when the band allocated for the random access signal of the general UE deviates from the band of the MTC device, shift a center of the band of the MTC device toward the band allocated for the random access signal of the general UE such that the band allocated for the random access signal of the general UE is included within the band of the MTC device.

The MTC device may further include a storage unit configured to store information on the bandwidth of the MTC device, information on a random access preamble format and transmission time, and information on a fixed value of a first physical resource block occupied by a physical random access channel resource.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

Accordingly, while the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims. Elements of the example embodiments are consistently denoted by the same reference numerals throughout the drawings and detailed description.

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

The term "terminal" used herein may also be referred to as motion station (MS), user equipment (UE), user terminal (UT), wireless terminal, access terminal (AT), subscriber unit, subscriber station (SS), wireless device, wireless communication device, wireless transmit/receive unit (WTRU), mobile node, mobile, or other terms. Examples of the terminal may include cellular phones, smart phones having a wireless communication function, personal digital assistants (PDAs) having a wireless communication function, wireless modems, portable computers having a wireless communication function, photographing devices such as digital cameras having a wireless communication function, gaming devices having a wireless communication function, music storing/reproducing home appliances having a wireless communication function, Internet home appliances capable of wireless Internet connection and browsing, and portable units or terminals having a combination of such functions; however, the present invention is not limited thereto.

The term "base station (BS)" used herein generally means a point communicating with a terminal, and may also be referred to as Node-B, eNode-B (eNB), base station transceiver system (BTS), access point, or other terms.

Hereinafter, example embodiments of the present invention will be described in detail with reference to the accompanying drawings. In describing the present invention, for ease of overall understanding, like elements refer to like reference numerals and like elements will not be described again.

Figure 1:
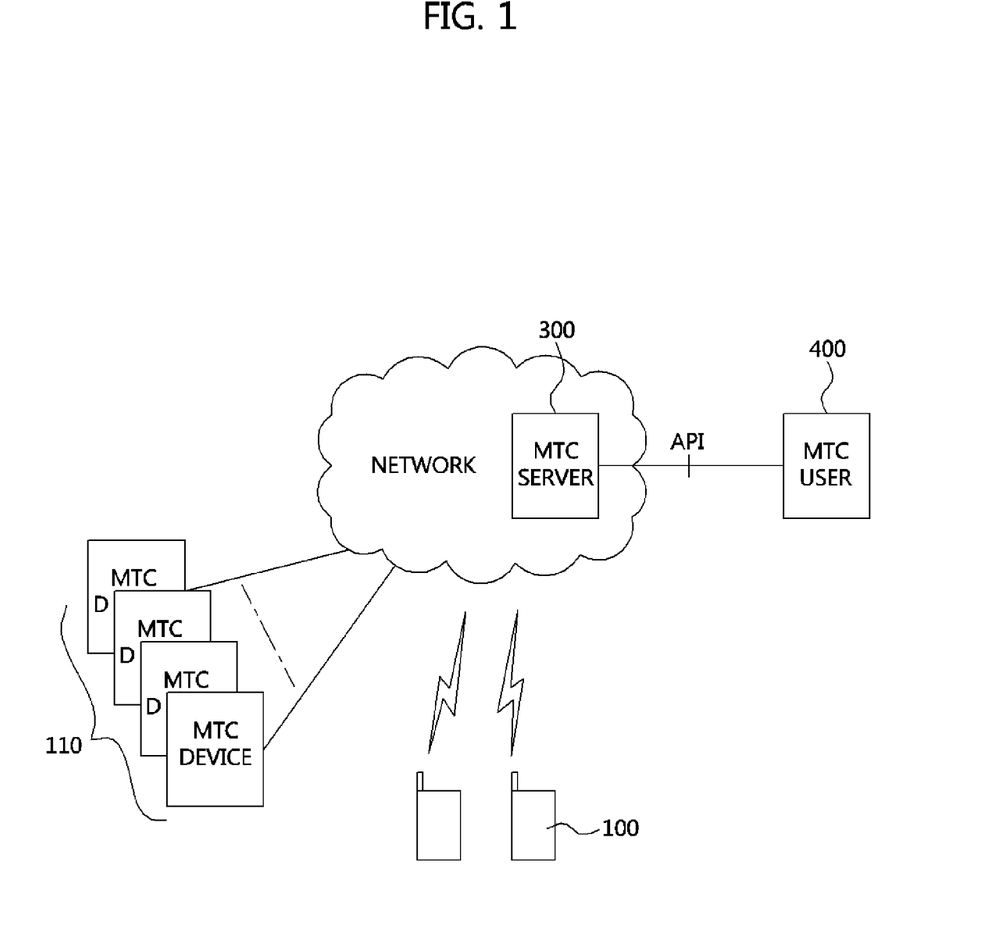
FIG. 1 is a conceptual diagram illustrating a wireless network providing an MTC service to which the present invention is applied.

FIG. 1 is a conceptual diagram illustrating a wireless network providing an MTC service to which the present invention is applied.

As illustrated in FIG. 1, a wireless network providing an MTC service includes an MTC server 300 for providing an MTC service, an MTC device 110, and an MTC user 400, in addition to the existing wireless network.

The MTC device 110 is a terminal (UE) that has an MTC function of communicating with the MTC server 300 and other MTC devices through a public land mobile network (PLMN).

The MTC server 300 communicates with the PLMN and communicates with the MTC device 110 through the PLMN. The MTC server 300 also has an interface accessible by an MTC user, and provides a service for the MTC user 400. The MTC user 400 uses a service provided by the MTC server 300.

In the configuration of FIG. 1, the MTC server 300 is controlled by a network operator. The network operator provides an application programming interface (API) on an MTC server, and the MTC user 400 accesses the MTC server of the network operator through the API.

FIG. 1 illustrates that the MTC server is included in a network operator domain. However, the MTC server may be located outside the network operator domain instead of being located inside the network operator domain. In this case, the MTC server is not controlled by the network operator.

In addition, the MTC device 110 communicates with the MTC server 300 located in the network through a base station (not illustrated).

Figure 2:
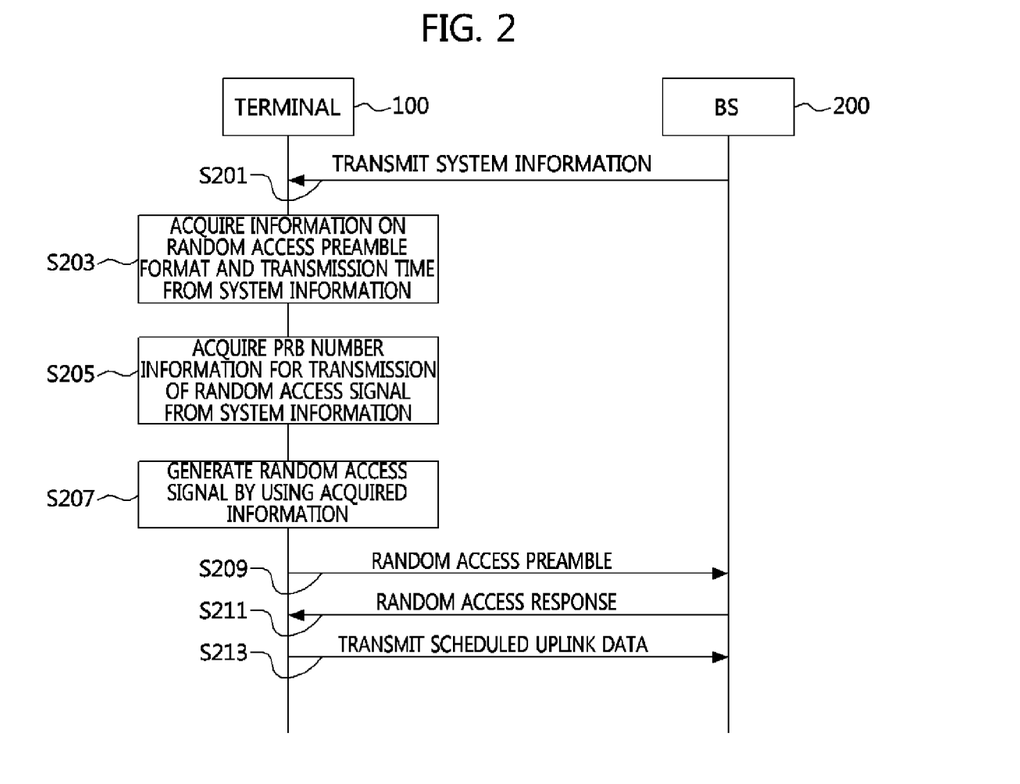
FIG. 2 is a flow diagram illustrating a message flow between a terminal and a base station in a random access process of the terminal in a 3GPP LTE system.

FIG. 2 is a flow diagram illustrating a message flow between a terminal and a base station in a random access process of the terminal in a 3GPP LTE system.

The random access process is a process for connecting to a network of the terminal. The random access process is performed in the events of initial connection, handover, scheduling request, uplink time synchronization acquisition, or the like. That is, all terminals perform random access for initial connection and data transmission.

The random access process illustrated in FIG. 2 refers to a random access signal generating process in 3GPP TS 36.211, among 3GPP LTE wireless transmission standards.

When selecting a random access preamble, the terminal uses information received through system information to determine a group to select by, and randomly determines a value therein to connect to the base station. That is, in order to perform a random access process, the terminal receives system information from the base station (S201).

Herein, in relation to system information including information related to selection of a random access preamble, in a 3GPP LTE system, a base station transmits system information including common channel-related information and overall information about the system to terminals through a common broadcast channel.

Three types of RRC messages are used to transmit system information, examples of which are an MIB message, an SIB1 message, and a system information (SI) message.

System information includes system information blocks (SIBs), and each system information block includes a series of functionally related parameters. Herein, depending on its characteristics, the system information block may be classified into a master information block (MIB) including a limited number of most frequently transmitted parameters that are parameters necessary for initial connection of the terminal to the network, a system information block type 1, (SIB1) including parameters necessary to determine whether a relevant cell is suitable for cell selection and information related to time domain scheduling of other SIBs, and a system information block type 2, (SIB2) including shared common channel information.

The terminal sets a channel after receiving the system information. In order to perform initial random access, the terminal analyzes information on a random access channel, selects one preamble among available random access preambles, and starts a random access process.

Specifically, among the system information received from the base station, the terminal acquires information on a preamble format for transmission of a random access signal and information on transmission time from a parameter related to a physical random access channel (PRACH) configuration index (prach-ConfigurationIndex) (S203).

There are five types of preamble formats: formats 0, to 4,, and each format is controlled by an upper layer according to frame structure and random access configuration. For each format, a cyclic prefix length $T_{CP}$, and a sequence length $T_{SEQ}$, are defined. In addition, for each PRACH configuration index, a preamble format for each frame structure, a density in units of 10, ms, and a version are defined.

Among the system information received from the base station, the terminal acquires physical resource block (PRB) number information in a frequency domain for transmission of a random access signal from a parameter related to a PRACH frequency offset (prach-FrequencyOffset) (S205).

The terminal generates a random access preamble signal by using the acquired information, that is, information on a preamble format for transmission of a random access signal and transmission time, and a PRB number in a frequency domain for transmission of a random access preamble signal (S207).

Thereafter, the terminal 100 selects the generated random access preamble randomly and transmits the selected preamble to the base station 200 (S209).

The base station 200 receives the preamble transmitted by the terminal 100, and transmits a random access response message to the terminal (S211). When receiving the random access response message for the preamble transmitted by the terminal, the terminal performs scheduled uplink transmission by using an uplink wireless resource allocated from the base station in order to establish a radio resource control (RRC) connection (S213).

In this regard, in the 3GPP LTE wireless transmission standard, in a cell, a base station allocates a 1.08, MHz frequency resource corresponding to six PRBs for reception of a random access signal, and a position of the random access frequency resource may be allocated for any frequency resource within the entire frequency domain of a base station (eNB) system bandwidth.

Thus, when a transmission bandwidth of an MTC device is smaller than a reception system bandwidth of a base station, for example, when a bandwidth of a base station system is 20, MHz and a transmission bandwidth of an MTC device is 1.4, MHz, a position of a random access frequency resource allocated by the base station may deviate from a frequency domain used by the MTC device. Accordingly, by the current standard, there is a problem in that the MTC device cannot generate or transmit a random access signal.

Thus, the present invention provides a method for generating a random access signal by an MTC device using a narrow bandwidth in a 3GPP LTE mobile communication system supporting a scalable system bandwidth of up to 20, MHz.

In addition, the present invention provides a method for generating a random access signal of an MTC device by optimizing a random access signal generating method specified in the 3GPP LTE wireless transmission standard when the MTC device has a narrow bandwidth, for example, a 1.4, MHz dedicated bandwidth.

The 3GPP LTE standard prescribes that transmission bandwidths such as 1.4, MHz, 3 MHz, 5, MHz, 10, MHz, 15, MHz, and 20, MHz are available. In addition, the number of PRBs used for the respective transmission bandwidths are defined as 6, PRBs, 15, PRBs, 25 PRBs, 50, PRBs, 75, PRBs, and 100, PRBs.

In addition, the 3GPP LTE wireless transmission standard prescribes that a random access signal occupies six PRBs corresponding to a 1.4, MHz bandwidth (an actually used frequency resource is 1.08, MHz and guard bands are present on both sides thereof).

Based on such an understanding of the 3GPP LTE mobile communication system, a method for generating a random access signal of an MTC device using a narrow bandwidth according to the present invention may be divided into two methods as described below in detail.

A random access signal generating method according to a first method of the present invention allocates a position in a frequency domain of a random access signal dedicated to the MTC device, that is, a position of a frequency for transmission of a random access preamble, to a center position of a base station system bandwidth.

A random access signal generating method according to a first method of the present invention shifts a center frequency of the MTC device to a position of a random access frequency allocated for a legacy LTE terminal by the base station.

Hereinafter, respective example embodiments will be described in detail with reference to FIGS. 3 to 6.

Figure 3:
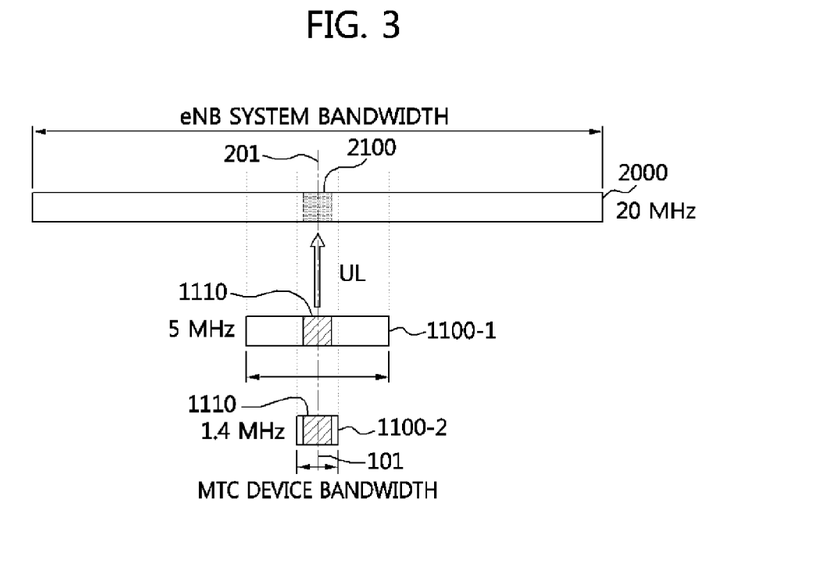
FIG. 3 is a conceptual diagram illustrating an example embodiment of a random access signal generating method according to a first method of the present invention.

FIG. 3 is a conceptual diagram illustrating an example embodiment of a random access signal generating method according to a first method of the present invention.

That is, FIG. 3 is a conceptual diagram illustrating an example embodiment of allocating a random access frequency resource 2100 dedicated to an MTC device to a center frequency position 201 of a base station (eNB) system bandwidth 2000.

FIG. 3 illustrates both a case 1100-1 where the MTC device (MTC terminal) has a bandwidth of 5, MHz, and a case 1100-2 where the MTC device has a bandwidth of 1.4, MHz. In both cases, as illustrated in FIG. 3, a center frequency 201 of a base station system bandwidth and a center frequency 101 of the MTC device are aligned. In this case, in addition to allocation of a random access resource such as transmission time and frequency position for a legacy LTE terminal in a cell, allocation of a random access resource dedicated to the MTC device may be required.

Herein, a resource 2100 allocated for preamble reception and a random access signal 1110 occupy a resource corresponding to six PRBs (1.08, MHz).

Figure 4:
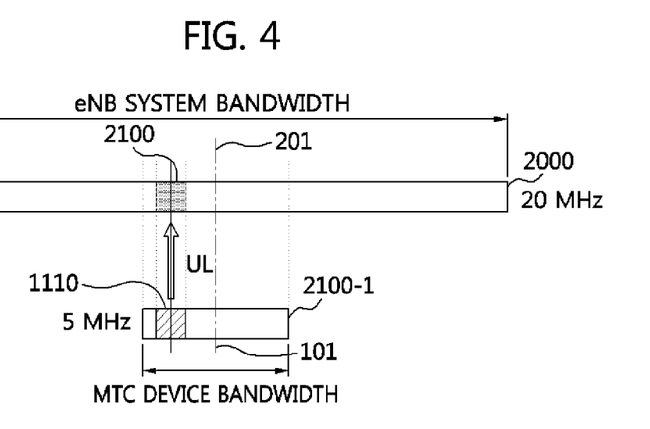
FIG. 4 is a conceptual diagram illustrating another example embodiment of a random access signal generating method according to the first method of the present invention.

FIG. 4 is a conceptual diagram illustrating another example embodiment of a random access signal generating method according to the first method of the present invention.

FIG. 4 is based on the case where a transmission bandwidth of the MTC device (MTC terminal) is 5, MHz. FIG. 4 illustrates an example embodiment of allocating a position of a random access frequency resource 1110 for the MTC device to a position of other frequency resource within a transmission bandwidth range of the MTC device (although not a center thereof) while a center frequency 201 of a base station system bandwidth and a center frequency 101 of the MTC device are aligned.

Figure 5:
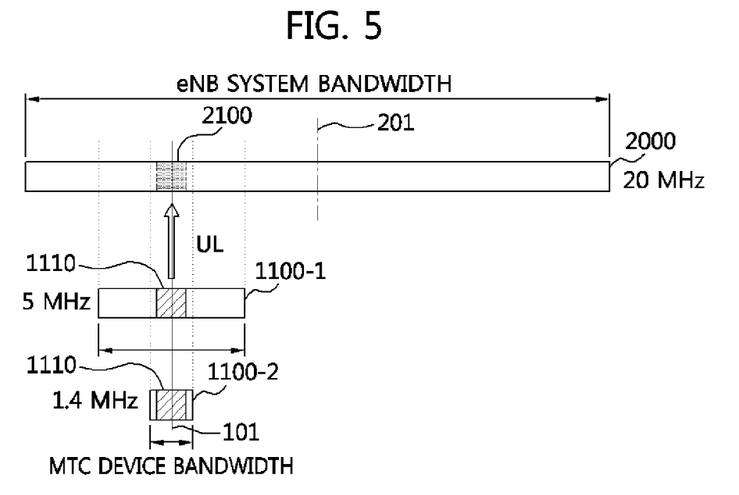
FIG. 5 is a conceptual diagram illustrating an example embodiment of a random access signal generating method according to a second method of the present invention.

FIG. 5 is a conceptual diagram illustrating an example embodiment of a random access signal generating method according to a second method of the present invention.

FIG. 5 is a block diagram of an example embodiment of shifting a center frequency 101 of the MTC device to a position of a random access frequency resource 2100 allocated for a legacy LTE terminal by the base station.

In this case, the MTC device may also use a random access resource such as transmission time and frequency position allocated for a legacy LTE terminal in a cell. However, the present embodiment does not preclude allocating a random access resource dedicated to the MTC device.

As illustrated in FIG. 5, the MTC device shifts a center frequency 101 of the MTC device to a center of a random access frequency position 2100 for a legacy LTE terminal allocated in a base station system bandwidth.

Figure 6:
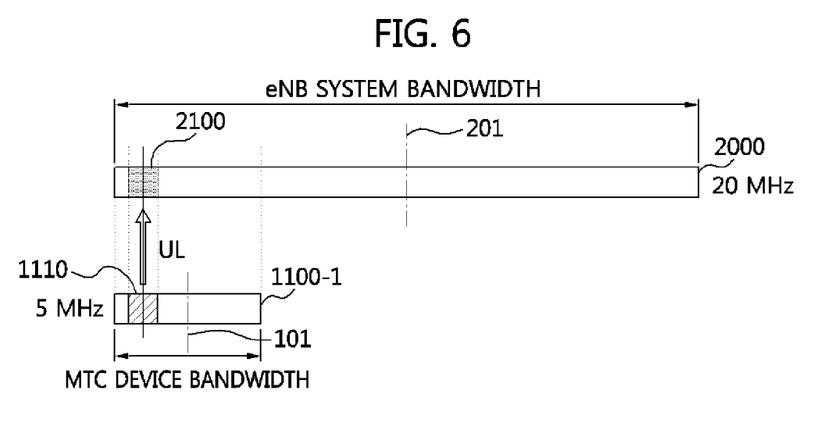
FIG. 6 is a conceptual diagram illustrating another example embodiment of a random access signal generating method according to the second method of the present invention.

FIG. 6 is a conceptual diagram illustrating another example embodiment of a random access signal generating method according to the second method of the present invention.

FIG. 6 illustrates an example embodiment of shifting a frequency band 1110 of the MTC device such that a random access frequency resource 2100 for a legacy LTE terminal is included in the range of an entire frequency band 1110-1 for the MTC device, as an extension of the example embodiment illustrated in FIG. 5.

In various example embodiments of a random access signal generating method according to the present invention illustrated in FIGS. 3 to 6, although the MTC device is described as using a narrow bandwidth such as 1.4, MHz or 5, MHz, the present invention is not limited thereto and the MTC device may use bandwidths other than 1.4, MHz and 5, MHz bandwidths.

In addition, when a transmission bandwidth of the MTC device is equal to or wider than a base station system bandwidth, the MTC device may share a random access resource such as transmission time and frequency position for a legacy LTE terminal in a cell with the legacy LTE terminal, or a random access resource dedicated to the MTC device may be allocated separately from a random access resource for the legacy LTE terminal.

Below, a description will be given of a random access signal generating method according to the present invention, which optimizes a random access signal generating method specified in the 3GPP LTE wireless transmission standard to an MTC device using a dedicated bandwidth of 1.4, MHz.

First, a conventional random access generating process will be described. Among system information received from a base station, a terminal acquires physical resource block (PRB) number information in a frequency domain for transmission of a random access signal from a parameter related to a PRACH frequency offset (prach-FrequencyOffset).

However, in the case of an MTC device using a narrow bandwidth according to the present invention, since it supports a predetermined bandwidth, for example, a 1.4, MHz bandwidth, PRB number information may be considered as being predetermined. That is, the present invention generates a random access signal by using a fixed parameter value for a PRB number in a frequency domain, without the need to receive a parameter related to a PRACH frequency offset.

In addition, the present invention optimizes an equation used to generate a random access signal in the 3GPP LTE wireless transmission standard to an equation for supporting an MTC device.

Figure 7:
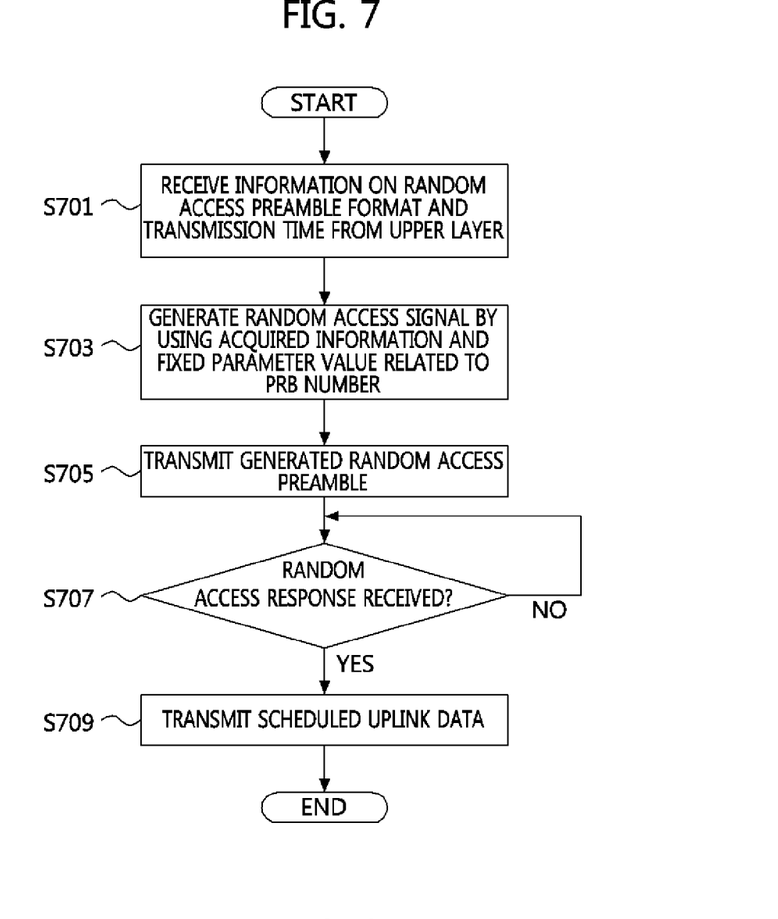
FIG. 7 is a flowchart illustrating a random access process in an MTC device (MTC terminal) according to the present invention.

FIG. 7 is a flowchart illustrating a random access process in an MTC device according to the present invention.

A UE acquires information on transmission time and a preamble format for transmission of a random access signal by receiving a parameter related to a PRACH configuration index (prach-ConfigurationIndex) from an upper layer (S701).

Thereafter, an MTC device generates a random access signal by using a fixed parameter value related to a PRB number in a frequency domain and information on transmission time and a preamble format for transmission of a random access signal, which is acquired through the upper layer (S703).

Herein, the difference of a random access signal generating method of the present invention from a conventional random access signal generating method specified in the standard will be described below.

A conventional equation for generating a random access signal is Equation 1, below:

$$s(t) = \beta_{PRACH}$$

Equation 1

$$\sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+K(k_0+\frac{1}{2}))\Delta f_{RA}(t-T_{CP})}$$

In Equation 1,, s(t) denotes a random access signal, $\beta_{PRACH}$, denotes an amplitude scaling factor, and $N_{ZC}$, denotes a Zadoff-Chu sequence length. In addition, $$k_0 = n_{PRB}^{RA} N_{sc}^{RB} - N_{RB}^{min,UL} N_{sc}^{RB}/2,$$

and $K=\Delta f/\Delta f_{RA}$, denotes a factor considering an interval between random access preamble transmission and uplink data transmission. In addition, $\Delta f$ denotes subcarrier spacing, and $\Delta f_{RA}$, is a value representing subcarrier spacing for a random access preamble and has a value determined according to a preamble format. φ is an offset value determining a frequency-domain position of a random access preamble in a PRB, and has a value determined according to a preamble format.

Herein, $n_{PRB}^{RA}$, denotes a first PRB occupied by a PRACH resource, which may be acquired by receiving a parameter related to a PRACH frequency offset (prach-FrequencyOffset) from an upper layer.

A random access signal generating method according to the present invention supporting an MTC device using a dedicated bandwidth of 1.4, MHz will be described below, in comparison with Equation 1.

A parameter $n_{PRB\ offset}^{RA}$, has a fixed parameter value without separate reception from an upper layer (for example, $n_{PRB\ offset}^{RA}=0$). In Equation 1, $N_{RB}^{UL}$, is changed into a fixed value $$N_{RB}^{min,UL}$$

(for example, $$N_{RB}^{min,UL} = 6).$$

Accordingly, the random access signal generating method according to the present invention may be expressed as Equation 2, below:

$$s(t) = \beta_{PRACH}$$

Equation 2

$$\sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+K(k_0+\frac{1}{2}))\Delta f_{RA}(t-T_{CP})}$$

In Equation 2,, s(t) denotes a random access signal, $\beta_{PRACH}$, denotes an amplitude scaling factor, and $N_{ZC}$, denotes a Zadoff-Chu sequence length. $K=\Delta f/\Delta f_{RA}$, denotes a factor considering an interval between random access preamble transmission and uplink data transmission. In addition, $\Delta f$ denotes subcarrier spacing, and $\Delta f_{RA}$, is a value representing subcarrier spacing for a random access preamble and has a value determined according to a preamble format. φ is an offset value determining a frequency-domain position of a random access preamble in a PRB, and has a value determined according to a preamble format.

In addition, $$k_0 = n_{PRB}^{RA} N_{sc}^{RB} - N_{RB}^{min,UL} N_{sc}^{RB}/2.$$

and $n_{PRB}^{RA}$, denotes a first PRB occupied by a PRACH resource, which is determined by a fixed parameter value $n_{PRB\ offset}^{RA}$.

Herein, as a method for determining a $n_{PRB}^{RA}$, value for each frame structure type, the present invention proposes the following three example embodiments:

First, a first PRB occupied by a PRACH resource for a frame structure type 1 (corresponding to FDD) may be defined as Equation 3, below:

$$n_{PRB}^{RA} = n_{PRB\ offset}^{RA} = \text{Fixed Constant Value}$$

Equation 3

Herein, when $n_{PRB\ offset}^{RA}$, has a fixed value '0', a value of $k_0$, is −36.

$$(k_0 = n_{PRB}^{RA} N_{sc}^{RB} - N_{RB}^{min,UL} N_{sc}^{RB}/2 = 0 \cdot 12 - 6 \cdot 12/2 = -36)$$

Second, a first PRB occupied by a PRACH resource for preamble formats 0, to 3 among a frame structure type 2, (corresponding to TDD) may be defined as Equation 4, below:

$$n_{PRB}^{RA} = \begin{cases} n_{PRB\ offset}^{RA} + 6\left\lfloor\frac{f_{RA}}{2}\right\rfloor, & \text{if } f_{RA} \bmod 2 = 0 \\ N_{RB}^{min,UL} - 6 - n_{PRB\ offset}^{RA} - 6\left\lfloor\frac{f_{RA}}{2}\right\rfloor, & \text{otherwise} \end{cases}$$

Equation 4

Herein, $n_{PRB\ offset}^{RA}$, is a fixed parameter value, which is not received from an upper layer.

Third, a first PRB occupied by a PRACH resource for a preamble format 4, among a frame structure type 2, (corresponding to TDD) may be defined as Equation 5, below:

Equation 5

$$n_{PRB}^{RA} = \begin{cases} 6f_{RA}, & \text{if } ((n_f \bmod 2) \times (2 - N_{SP}) + t_{RA}^{(1)}) \bmod 2 = 0 \\ N_{RB}^{min,UL} - 6(f_{RA} + 1), & \text{otherwise} \end{cases}$$

The MTC device generates a random access preamble by using information on the first PRB occupied by the PRCH resource determined according to one of Equations 3, to 5 (S703).

Referring to FIG. 7, the MTC device transmits the generated random access preamble to the base station (S705). The MTC device waits to receive a random access response from the base station (S707), and performs scheduled uplink transmission (S709).

Figure 8:
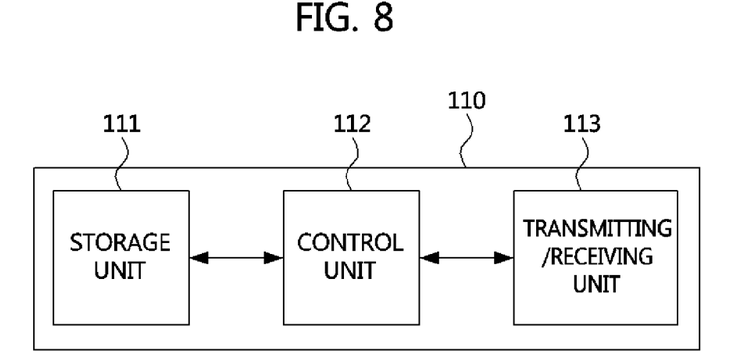
FIG. 8 is a block diagram of an MTC device according to an example embodiment of the present invention.

FIG. 8 is a block diagram of an MTC device according to an example embodiment of the present invention.

An MTC device 110 according to the present invention may include a storage unit 111, a control unit 112, and a transmitting/receiving unit 113.

The transmitting/receiving unit 113 receives system information transmitted by a base station, transmits the received system information to the control unit 112, and transmits a random access preamble generated by the control unit 112 to the base station.

The storage unit 111 stores information on a bandwidth of the MTC device, information on a random access preamble format and transmission time, and information on a fixed value of a first physical resource block occupied by physical random access channel resource.

The control unit 112 extracts random access-related information from the received system information, and generates a random access signal by using the extracted random access-related information and predetermined frequency resource block-related information for a random access signal.

Herein, the random access-related information includes information on a preamble format and transmission time.

In addition, the predetermined frequency resource block-related information for the random access signal includes information on a first physical resource block occupied by a physical random access channel resource. A position of the first physical resource block occupied by the physical random access channel resource can be set to a fixed value according to the bandwidth of the MTC device.

In addition, the control unit acquires information on a band allocated to a random access signal of a general user equipment (UE) by the base station from the system information received by the transmitting/receiving unit, and when the band allocated to the random access signal of the general UE deviates from the band of the MTC device, shifts a center of the band of the MTC device toward the band allocated to the random access signal of the general UE such that the band allocated to the random access signal of the general UE is included within the band of the MTC device.

When the random access signal generating method described above is used, it is possible to generate a random access signal that can be smoothly communicated between an MTC device using a narrow bandwidth and a 3GPP LTE mobile communication system supporting a scalable system bandwidth of up to 20, MHz.

In addition, according to the present invention, when the MTC device has a dedicated bandwidth of 1.4, MHz, the random access signal generating method can be simplified.

In addition, the existing wireless transmission standard can be changed into a wireless transmission standard optimized for MTC dedication, and unnecessary upper layer parameters can be removed to reduce the total number of upper layer parameters.

While the example embodiments of the present invention and their advantages have been described in detail, it should be understood that various changes, substitutions and alterations may be made herein without departing from the scope of the invention.

What is claimed is:

1. A method for generating a random access signal of a machine type communication (MTC) device using a narrow bandwidth, comprising:
    receiving, via a transmitting and receiving unit within the MTC device, system information transmitted by a base station (BS);
    extracting, via a control unit within the MTC device, random access-related information from the system information received;
    generating, via the control unit within the MTC device, the random access signal by using the random access-related information extracted and predetermined frequency resource block-related information for the random access signal; and
    acquiring, via the control unit within the MTC device, information on a band allocated for the random access signal of a general user equipment (UE) by the BS; and
    when the band allocated for the random access signal of the general UE deviates from band of the MTC device, shifting, via the control unit within the MTC device, a center of the band of the MTC device toward the band allocated for the random access signal of the general UE such that the band allocated for the random access signal of the general UE is included within the band of the MTC device.

2. The method of claim 1, wherein the random access-related information includes information on a preamble format and transmission time.

3. The method of claim 1, wherein the predetermined frequency resource block-related information for the random access signal includes information on a first physical resource block occupied by a physical random access channel resource.

4. The method of claim 3, wherein the position of the first physical resource block occupied by the physical random access channel resource is set to a fixed value according to the bandwidth of the MTC device.

5. The method of claim 1, wherein a band used by the MTC device is located within a system bandwidth used by the BS.

6. The method of claim 5, wherein the band used by the MTC device is located at a center of the system bandwidth used by the BS.

7. A machine type communication (MTC) device comprising:
    a transmitting and receiving unit that receives system information transmitted by a base station (BS); and
    a control unit that extracts random access-related information from the system information received and generate a random access signal by using the random access-related information received and predetermined frequency resource block-related information for the random access signal,
    wherein the control unit acquires information on a band allocated for the random access signal of a general user equipment (UE) by the BS from the system information received by the transmitting and receiving unit and, when the band allocated for the random access signal of the general UE deviates from the band of the MTC device, shifts a center of the band of the MTC device toward the band allocated for the random access signal of the general UE such that the band allocated for the random access signal of the general UE is included within the band of the MTC device.

8. The MTC device of claim 7, wherein the random access-related information includes information on a preamble format and transmission time.

9. The MTC device of claim 7, wherein the predetermined frequency resource block-related information for the random access signal includes information on a first physical resource block occupied by a physical random access channel resource.

10. The MTC device of claim 9, wherein a position of the first physical resource block occupied by the physical random access channel resource is set to a fixed value according to the bandwidth of the MTC device.

11. The MTC device of claim 7, wherein a band used by the MTC device is located within a system bandwidth used by the BS.

12. The MTC device of claim 11, wherein the band used by the MTC device is located at a center of the system bandwidth used by the BS.

13. The MTC device of claim 7, further comprising a storage unit configured to store information on the bandwidth of the MTC device, information on a random access preamble format and transmission time, and information on a fixed value of a first physical resource block occupied by a physical random access channel resource.

* * * * *